US007838446B2

(12) United States Patent
Jarck

(10) Patent No.: US 7,838,446 B2
(45) **Date of Patent: *Nov. 23, 2010**

(54) WOOD ENHANCEMENT AGENT TREATED ENGINEERED WOOD PRODUCTS

(75) Inventor: Walter Jarck, Clarkesville, GA (US)

(73) Assignee: Timtek, LLC, Clarkesville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/400,890

(22) Filed: Mar. 10, 2009

(65) Prior Publication Data

US 2009/0169909 A1 Jul. 2, 2009

Related U.S. Application Data

(62) Division of application No. 11/564,127, filed on Nov. 28, 2006, now Pat. No. 7,507,360.

(60) Provisional application No. 60/740,359, filed on Nov. 29, 2005.

(51) Int. Cl.
*B32B 27/12* (2006.01)
*B32B 27/04* (2006.01)

(52) U.S. Cl. ............................ 442/43; 442/58; 442/79; 442/123; 442/124; 442/131; 442/152; 442/153

(58) Field of Classification Search ............... 442/1–58, 442/79, 123, 124, 131, 152, 153
See application file for complete search history.

(56) References Cited

U.S. PATENT DOCUMENTS 3,870,665 A 3/1975 Diehr et al.

(Continued)

FOREIGN PATENT DOCUMENTS

AU WO85/02366 6/1985

(Continued)

OTHER PUBLICATIONS

College of Forest Resources, Mississippi State University, Forest & Wildlife Research Center. The Use of Antioxidants to Increase the Effectiveness of Wood Preservatives. [online], [retrieved on Dec. 4, 1998]. Retrieved from the Internet <URL:http://www.cfr.msstate.edu/fwrc/forestp/anti.htm>.

(Continued)

*Primary Examiner*—Ula C Ruddock
(74) *Attorney, Agent, or Firm*—Morris Manning Martin LLP; John R. Harris; Daniel E. Sineway

(57) ABSTRACT

A wood enhancement agent treated engineered wood product. The wood enhancement agent typically includes at least one of a preservative, a water repellant, a fungicide, an insecticide, a stabilizing agent, wax, an ultra-violet light inhibitor, and combinations thereof, and may also include an antioxidant. The wood enhancement agent is incorporated into the engineered wood product during a billet making process or after forming the billet. The wood enhancement agent may be applied simultaneously with a bonding agent or at a later time, for example applied to a scrim log mat during a pre-press process or inside a steam press chamber. Alternatively, the wood enhancement agent may be applied to a warm billet after steam press, or to a reheated billet, by dipping, spraying, or flood coating the billet, or by diffusion, vacuum impregnation, pressure, or a combination thereof.

10 Claims, 8 Drawing Sheets

U.S. PATENT DOCUMENTS

| | | | |
|---|---|---|---|
| 4,232,067 | A | 11/1980 | Coleman |
| 4,393,019 | A | 7/1983 | Geimer |
| 4,517,147 | A | 5/1985 | Taylor et al. |
| 4,695,345 | A | 9/1987 | Grace |
| 4,704,316 | A | 11/1987 | Grace |
| 4,711,684 | A | 12/1987 | Coleman |
| 4,711,689 | A | 12/1987 | Coleman |
| 5,161,591 | A | 11/1992 | Sealey et al. |
| 5,246,652 | A | 9/1993 | Hsu et al. |
| 5,279,691 | A | 1/1994 | Stickland |
| 5,763,338 | A | 6/1998 | Sean |
| 5,972,266 | A | 10/1999 | Fookes et al. |
| 6,030,562 | A | 2/2000 | Lehtinen et al. |
| 6,187,234 | B1 | 2/2001 | Bonomo et al. |
| 6,263,773 | B1 | 7/2001 | McAdoo et al. |
| 6,318,046 | B1 | 11/2001 | Horsfield et al. |
| 6,344,165 | B1 | 2/2002 | Coleman |
| 6,428,871 | B1 | 8/2002 | Cozzolino |
| 6,569,540 | B1 | 5/2003 | Preston et al. |
| 6,635,141 | B2 | 10/2003 | Horsfield et al. |
| 2003/0009043 | A1 | 1/2003 | Partridge et al. |
| 2003/0026942 | A1 | 2/2003 | Hejna et al. |
| 2003/0224179 | A1 | 12/2003 | Skinner et al. |
| 2006/0060290 | A1 | 3/2006 | Jarck |
| 2006/0086427 | A1 | 4/2006 | Jarck |
| 2006/0125152 | A1 | 6/2006 | Gardner et al. |
| 2007/0001337 | A1 | 1/2007 | Bales |

FOREIGN PATENT DOCUMENTS

| | | |
|---|---|---|
| AU | WO85/02367 | 6/1985 |
| AU | WO85/02368 | 6/1985 |
| AU | WO85/02369 | 6/1985 |
| AU | WO85/02370 | 6/1985 |
| AU | WO88/04983 | 7/1988 |
| AU | WO89/11383 | 11/1989 |
| GB | 2176791 | 1/1987 |
| WO | WO2006/036713 | 4/2006 |

OTHER PUBLICATIONS

Schultz TP, Nicholas DD, Development of environmentally-benign wood preservatives based on the combination of organic biocides with antioxidants and metal chelators, Phytochemistry, Nov. 2002; 61(5):555-60. Abstract.

WOOD ENHANCEMENT AGENT TREATED ENGINEERED WOOD PRODUCTS

CROSS-REFERENCE TO RELATED PATENT APPLICATION

This application is a divisional and claims the benefit of and priority to U.S. patent application Ser. No. 11/564,127, filed Nov. 28, 2006, entitled "SYSTEM AND METHOD FOR THE PRESERVATIVE TREATMENT OF ENGINEERED WOOD PRODUCTS", by Walter Jarck, now U.S. Pat. No. 7,507,360, and U.S. provisional patent application No. 60/740,359, filed Nov. 29, 2005, entitled "SYSTEM AND METHOD FOR THE PRESERVATIVE TREATMENT OF ENGINEERED WOOD PRODUCTS", by Walter Jarck, both of which are incorporated herein by reference in their entirety.

FIELD OF THE INVENTION

The present invention generally relates to methods of forming preservative treated wood products, and more specifically to a method of forming preservative treated engineered wood products during a billet making process.

BACKGROUND OF THE INVENTION

In North America there are a wide variety of forest tree species. Many of these tree species make excellent durable building materials, while other tree species quickly decay or are prone to be riddled by insects. It has been found that a variety of tree species endure because they comprise natural preservatives that repel insects and discourage decay. Included in this grouping of naturally insect and decay resistant varieties of trees are cypress, cedar, chestnut, and live-oak trees. However, as the demand for housing has grown, the supply of these trees has proven to be insufficient to keep pace with the demand for durable products that are manufactured from the trees.

One approach to increasing the supply of structural wood products is to use younger tree stocks to make engineered wood products. Engineered wood products or "EWP," also referred to as "structural composite lumber" or "SCL," are fiber-glue composites made by various processes. EWP products are different from panel type products such as plywood, oriented strand board (OSB), particle board, and the like. EWP products can be manufactured to any length, offering an advantage over normal wood members which are limited in length by the size of available raw wood. Systems and methods for manufacturing engineered wood products are described in U.S. patent application Ser. No. 11/162,747 (U.S. Patent Application Publication No. 2006/0086427) entitled "A System and Method for the Manufacture of Reconsolidated or Reconstituted Wood Products," and U.S. patent application Ser. No. 11/162,748 (U.S. Patent Application Publication No. 2006/0060290) entitled "Systems and Methods for the Production of Steam-Pressed Long Fiber Reconsolidated Wood Products," the disclosures of which are incorporated herein by reference and made a part hereof.

As described in the referenced and incorporated patent applications, the process of making engineered wood products initially involves crushing and scrimming of small logs into long strands or scrim. After drying and adding adhesives and/or bonding agents to the wood strands or scrim, the wood strands or scrim are reconstituted into billets, and then the billets are formed into beams and other engineered wood products by using steam press technology in which steam and/or pressure are utilized to produce high quality engineered wood products. Although engineered wood products are often made from scrim, those skilled in the art will understand that such products can also be made from strands, veneers, fibers, and combinations thereof.

In response to the limited supply of naturally insect and decay resistant trees for the production of lumber products and the use of less resistant tree stock for making EWP, modern builders have developed processes to add man-made preservatives to lumber products that are produced from non-insect and decay resistant tree species in order to produce large amounts of durable commodity building products needed today. Presently, there are processes that use pressure to introduce chemical preservatives into the structure of wood or a wood product. The wood or wood product to be treated is initially inundated in preservative chemicals, and thereafter placed into a pressure vessel and pressurized in order to force chemical preservatives into the wood structure and thus become a barrier against insects and decay. Common chemicals that are used in today's processes include water-borne chromated copper arsenate (CCA), ammoniacal copper zinc arsenate (ACZA), and ammoniacal copper quat (ACQ).

The conventional methods that are used to chemically treat wood and wood products have limitations and drawbacks such as high costs in preserving a wood product, uneven distribution of biocides throughout the wood product, and the need for biocides that are not safe to use in habitable spaces or for framing around them. Therefore, a heretofore unaddressed need exists in the art to address the aforementioned deficiencies and inadequacies, especially in connection with the manufacture of engineered wood products.

SUMMARY OF THE INVENTION

The present invention seeks to solve the problems and limitations posed in preserving wood products for use in habitable spaces or as framing surrounding them by providing methods for wood enhancement agent treatment of engineered wood products during the billet making process.

One aspect of the invention is a method in which a wood enhancement agent is applied to wood scrim strands after they have been treated with a bonding agent. The method includes providing a scrim log material mat that contains bonding agent treated-scrim fiber strands and applying to it a wood enhancement agent in an amount effective: (1) to at least substantially preserve the resulting wood product against at least one of rot, fungi, termites, or other wood destroying organisms; (2) to reduce the degree of swelling of the wood product in the presence of moisture; or (3) both. The amount of the wood enhancement agent applied is sufficient to substantially cover the surfaces of the scrim log material mat. The wood enhancement agent-coated scrim log material mat is then subjected to a steam press process in a steam press chamber to form a wood enhancement agent-treated billet, the thickness of which may be up to, or greater than, 2 inches, e.g., in the range of from about 2 inches to about 8 inches.

In one embodiment, the application of a wood enhancement agent to a scrim log material mat is performed inside a steam chamber. Alternatively, the wood enhancement agent is applied to the warm scrim log material mat before the mat enters a steam press chamber, such as during pre-press of the scrim log material mat.

Preferably, the scrim log material mat to which the wood enhancement agent is applied includes lay-up mats. More preferably, the lay-up mats comprise pre-pressed scrim log material mats. After a steam pressing, a wood enhancement agent treated billet is formed, which may be further subjected to cutting and finishing to make a desirable size of wood enhancement agent treated engineered wood products, or if desired, which may further undergo a supplemental treatment with the same or different wood enhancement agents.

The wood enhancement agent includes at least one agent selected from a preservative, a water repellant, a fungicide, an insecticide, a stabilizing agent, wax, a ultra-violet light inhibitor, and combinations thereof. The preservative may include at least one antioxidant. The wood enhancement agent is present in an amount effective to achieve a desirable result. When a preservative, a fungicide, or an insecticide is included, it is present in an amount effective to reduce the rate of deterioration of an engineered wood product, compared to the rate of deterioration of an analogous engineered wood product lacking the preservative. When a water repellant, a stabilizing agent, or wax is included, it is present in an amount effective to reduce the moisture-induced swelling of the wood product to less than that of an analogous engineered wood product not treated with the water repellant, stabilizing agent, or wax.

Another aspect of the invention is a method in which a wood enhancement agent treatment is applied to wood scrim strands of a scrim log material mat at the same time with a bonding agent or adhesive. The method includes providing a scrim log material mat that contains scrim fiber strands and applying to it a liquid comprising a wood enhancement agent and a bonding agent in an effective amount. The amount of the wood enhancement agent applied is sufficient to substantially cover the surfaces of the scrim log material mat. After being treated with the wood enhancement agent plus the bonding agent, the scrim log material mat is dried to a desired degree of dryness and then subjected to a steam press process in a steam press chamber to form a wood enhancement agent-treated billet, the thickness of which may be up to 2 inches or less.

According to another aspect of the invention, after the drying but prior to the steam press process as aforementioned, a plurality of dry wood enhancement agent plus adhesive treated scrim log material mats may be aligned to form lay-up mats. The lay-up mats are then subjected to pre-press and steam press processes to form a wood enhancement agent treated billet. The billet may be further subjected to cutting and finishing to make wood enhancement agent treated engineered wood products of desirable size.

Yet another aspect of the invention is a method in which the wood enhancement agent as identified above is applied after a steam press process to a warm billet formed from scrim, veneers, strands, fibers, or any combinations thereof. The method includes providing a warm steam-pressed billet and applying to it a solution containing the wood enhancement agent as identified above in an effective amount. The amount of the wood enhancement agent applied is sufficient to substantially cover the surfaces of the warm billet. After the treatment, the warm billet is allowed to cool down. The formed wood enhancement agent-treated billet may have a thickness of up to 2 inches or less. After cooling down, the wood enhancement agent-treated billet is further subjected to cutting and finishing to form wood enhancement agent-treated engineered wood product. This method may be employed as a stand-alone treatment or supplemental treatment for billets formed from treated scrim, veneers, strands, fibers, or combinations thereof. For a supplemental treatment, the billet formed from treated scrim, veneers, strands, fibers, or combinations thereof may be applied with the same wood enhancement agent or different ones.

In one embodiment of the invention, a wood enhancement agent is applied to a steam-pressed billet having a temperature of greater than about 130° F. The steam-pressed billet may have a temperature in a range of from about 130° F. to about 350° F., from about 150° F. to about 350° F., or from about 180° F. to about 300° F.

The warm billet may be transported directly from a steam press chamber to an enclosed area, where a chemical applicator with spray nozzles may spray a wood enhancement agent-containing liquid to substantially cover the surfaces of the warm billet. Other techniques that may be used to apply the wood enhancement agent to a warm billet include, but are not limited to, dipping, flood coating, diffusion, vacuum impregnation, pressure, or any combination thereof.

Yet another aspect of the invention is a wood enhancement agent treated engineered wood product made by the method described above.

One embodiment of the invention is an engineered wood product that includes a reconstituted wood product consolidated from a scrim log material mat having scrim fiber strands, and a wood enhancement agent substantially uniformly distributed in the scrim fiber strands. The wood enhancement agent therein is applied to the scrim log material mat before the scrim log material mat is subjected to a steam press process to form the wood enhancement agent treated engineered wood product. Alternatively, the wood enhancement agent therein is applied to the scrim log material mat at the same time with a bonding agent or adhesive, and thereafter, the treated scrim log material mat is subjected to a steam press process to form the wood enhancement agent treated engineered wood product. Optionally, the wood enhancement agent may be applied to the scrim log material mat after a bonding agent treatment and a drying process. Moreover, the wood enhancement agent may be applied after the scrim log material mat enters the steam press chamber, or before the mat enters the chamber.

Another embodiment of the invention is an engineered wood product that includes a reconstituted wood product consolidated from a scrim log material mat having scrim fiber strands, and a wood enhancement agent substantially uniformly distributed in the scrim fiber strands, in which the wood enhancement agent is applied to a warm billet after the billet is formed by steam press.

Yet another embodiment of the invention is a wood enhancement agent treated engineered wood product, in which the depth of the absorption or penetration of the wood enhancement agent within the wood product is at least larger than a first minimal value but smaller than a first maximum value.

Therefore, it is one object of the present invention to provide a method of making a wood enhancement agent treated engineered wood product during a billet making process.

It is a further object of the present invention to provide a wood enhancement agent treated engineered wood product reconstituted from a scrim log material mat containing scrim fiber strands, in which the wood enhancement agent is applied to the scrim log material mat during a billet making process.

The methods provided by the invention afford advantages of preserving the stability and quality of engineered wood products with less cost, more even distribution of wood enhancement agent throughout the engineered wood products, and allows the use of biocides safe for use in or around habitable spaces.

These and other aspects will become apparent from the following description of the preferred embodiment taken in conjunction with the following drawings, although variations and modifications therein may be affected without departing from the spirit and scope of the novel concepts of the disclosure.

The accompanying drawings illustrate one or more embodiments of the invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
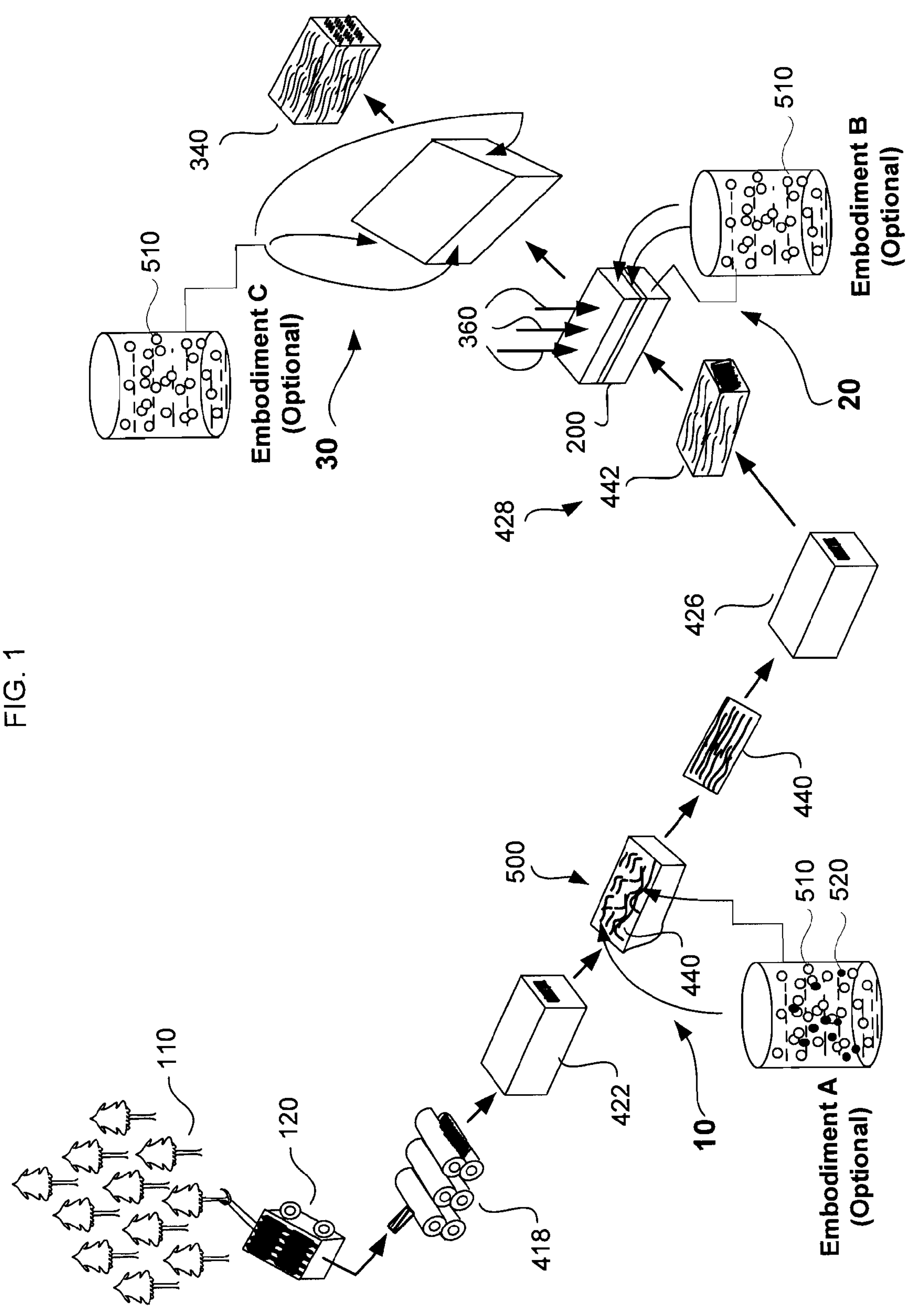
FIG. 1 is diagram of a flow process of making wood enhancement agent treated engineered wood products according to three major embodiments A-C.

The present invention is more particularly described in the following examples that are intended as illustrative only since numerous modifications and variations therein will be apparent to those skilled in the art. Various embodiments of the invention are now described in detail. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As used herein, "engineered wood products" or "EWP" means "structural composite lumber" or "SCL." EWP members differ from conventional wood products in that EWP members are fiber-glue composites. I-beam type EWP members typically have flange members of solid cut wood and web members of composite wood. EWP members also include rectangular beams formed of lumber strips or veneers glued together. These products are known as glue laminated beams, laminated veneer lumber (LVL), or Microlam.RTM. Parallam.RTM., laminated strand lumber (LSL), and by other names. EWP members are differentiated in the art from panel type products such as plywood, oriented strand board (OSB), particle board and the like. EWP can be manufactured to any length, offering an advantage over normal wood members which are limited in length by the size of available raw wood. The solid wood flanges are typically woven together with glue at periodic finger joints. For convenience in shipping, the EWP members are usually manufactured at lengths of 40, 48, and 60 feet.

As used herein, "around", "about" or "approximately" shall generally mean within 20 percent, preferably within 10 percent, and more preferably within 5 percent of a given value or range. Numerical quantities given herein are approximate, meaning that the term "around," "about," or "approximately" can be inferred if not expressly stated.

As used herein, the terms "effective amount" and "sufficient amount" are used interchangeably and mean an amount needed to achieve the desired effects or results in an engineered wood product. It is an amount effective: (1) to at least substantially preserve the resulting wood product against at least one of rot, fungi, termites, or other wood destroying organisms; (2) to reduce the degree of swelling of the wood product in the presence of moisture; or (3) both. The amount of the wood enhancement agent applied is sufficient to substantially cover the surfaces of the scrim log material mat.

As used herein, the term "warm" means at a moderately high temperature compared to ambient temperature; characterized by comparatively high temperature; or at a temperature needed to achieve the desired effects or results in an engineered wood product.

As used herein, the terms "bonding agent" and "adhesive" are used interchangeably.

OVERVIEW OF THE INVENTION

The present invention provides methods for wood enhancement agent treatment of engineered wood products. The process of making engineered wood products begins by crushing and scrimming of small logs into long strands or scrim. After drying and adding adhesives and/or bonding agents to the wood strands, the wood strands are reconstituted into billets, and the billets are then formed into beams and other engineered wood products by using steam press technology in which steam and/or pressure are utilized to produce high quality engineered wood products. One aspect of the present invention involves introducing relatively innocuous chemicals (e.g., borax compounds to discourage both rot and insect infection, cedar oil in combination with silanes and/or silicone compounds) into engineered wood products during a billet making process. The methods provided by the invention not only can reduce the cost of preserving a wood product, but also permit the use of biocides safe to use in or around habitable spaces, and even distribution of biocides throughout the wood product.

The addition of biocides to billet beams during the manufacturing process will protect the beams, depending on the biocide formulation chosen, from mold, decay fungi as well as subterranean and dry-wood termites and beetles (e.g., lyctid beetles with hardwood furnish, anobiid beetles and old house borers with conifer furnish, or bostrichids with either furnish). Further, the addition of water repellants and ultraviolet light inhibitors to the wood products will protect them from UV-induced graying and excessive wetting and associated swelling.

Alternatively, chemical formulations may be applied to warm billets after pressing, the solutions applied by dip or spray will be drawn into the billets as the hot air within the billet cools, thereby achieving a vacuum impregnation.

Further still, the wood enhancement agent may be applied to a reheated billet of engineering wood product, after the billet or cut products have reached ambient temperature, but reheated in an oven, steam bath, hot water immersion, or other process to (a) raise the internal temperature of the engineered wood product, and/or (b) raise the moisture content of the engineered wood product.

The description will be made as to the embodiments of the present invention in conjunction with the accompanying drawings of FIGS. 1-6. In accordance with aspects of the invention, as embodied and broadly described herein, there is provided a system and a method for wood enhancement agent treatment of an engineered wood product. The invention provides methods of preserving a wood product at a lower cost, with a more even distribution of biocides throughout the wood product, and without the need for use of biocides not safe for use in or around habitable spaces.

Without intent to limit the scope of the invention, these and other aspects of the present invention are more specifically described in the following exemplary embodiments. Note that names, geometric shapes, and positions of various components used in the exemplary embodiments are for illustration only and should not limit the scope of the invention.

Referring now to the FIGS. 1-6, in which like numerals refer to like elements throughout the several views, FIG. 1 illustrates steps of a process of manufacturing a wood enhancement agent treated engineered wood product according to various aspects of the invention. In particular, three embodiments are illustrated in FIG. 1 (Embodiments A, B, and C), which embodiments differ primarily in the location and manner of applying wood enhancement agents during the formation of an engineered wood product. Timber logs 120 are harvested from small trees from a wide variety of species 110. After cleaning and debarking, the timber logs are crushed by scrim rolls 418 into strands up to 8-10 feet long and the strands dried in a dryer 422. The dried strands 440 are then coated with a formaldehyde-free adhesive or bonding agent at a chemical or bonding agent/resins application area 500. The coated strands 440 are further dried at a second dryer 426 and then aligned parallel to each other at a mat lay-up area 428 to take advantage of the natural strength of the wood. The lay-up mats 442 are passed through a steam injection pressing process 360 in a steam press chamber 200 which laminates the strands into solid billets of wood 340 up to 8 inches thick. The billets 340 can then be cut to specification to make engineered wood products.

The present invention provides methods for wood enhancement agent treatment of engineered wood products during the aforementioned billet making process. In one embodiment of the invention (Embodiment A) shown at 10, a wood enhancement agent 510 and an adhesive/or bonding agent 520 are mixed together in a chemical liquid, which is then applied to dried wood strands 440 at application area 500.

The wood enhancement agent 510 may include at least one chemical selected from the group consisting of a preservative, a water repellant, a fungicide, an insecticide, a stabilizing agent, wax, a ultra-violet light inhibitor and any combinations thereof. Particular formulations believed to be suitable for use as a wood enhancement agent include the CEDARTREAT™ material, which comprises an admixture of cedar oil, silane, and a solvent. Such formulations provide a desirable combination of preservative, a water repellant, a fungicide, an insecticide, and a stabilizing agent. Other formulations that include cedar oil are also believed suitable such as the CEDARSHIELD™ and CEDARSEAL™ materials, which are believed to comprise an admixture of cedar oil, a silicone material, and a proprietary hydrocarbon carrier developed by Conoco Phillips Petroleum Company. All of these products are available from CedarCide Industries, Inc., 4405 N Frazier St., Conroe, Tex. 77303-1442. Further details of the products are available from the manufacturer. Cedar oil is known to have natural insect-repelling properties. Silicone is known to have water repelling properties. Other naturally occurring wood preservative and insect-repelling materials may also be used, as well as man-made preservative and insect-repelling materials, but a cedar-based material is presently preferred because of its known properties and environmental acceptability.

The following table illustrates exemplary formulations of a cedar-oil based wood enhancement agent that includes cedar oil, silane, and a solvent:

TABLE 1

| | Formula 1 | Formula 2 | Formula 3 | Formula 4 | Formula 5 |
|---|---|---|---|---|---|
| Cedar Oil | 0% | 2% | 2% | 5% | 10% |
| Silane | 5% | 2% | 5% | 5% | 10% |
| Solvent | 95% | 96% | 93% | 90% | 80% |

It will of course be appreciated that Formula 1, which contains no cedar oil, will not possess the insect-repelling properties provided by that substance.

Of the foregoing formulations, Formula 4 is presently preferred and is believed to possess a desirable combination of wood enhancement and ease of application.

Suitable preservatives for use in the invention provide protection and repellant properties against one or more of termites, ants (for example, carpenter ants) and other wood-destroying insects or fungi, soft rot, and mold fungi. Examples of wood-destroying fungi and soft rot and mold fungi are: *Gloeophyllum trabeum, Trametes versicolor, Paxillus panuoides, Condrostereum purpurescens, Heterobasidium annosum, Bispora effusa, Stachybotrys atra, Chaetomium globosum, Trichoderma viride, Aspergillus niger, Hormiscium* spec., and *Stemphylium* spec. Engineered wood products are preserved using a sufficient amount of wood preservative compounds known or believed to be effective against one or more of these organisms. Although cedar-oil based compounds are presently preferred, other types of wood preservative materials are also suitable for use in the invention.

Any preservative which is compatible with the adhesive system may be used, such as borax compounds, sodium silicate, and the like. Preservatives such as pentachlorophenol or creosote are preferably excluded from use in the present invention as they would cause problems during the manufacturing process due to vaporization at press temperature, and are generally less suitable from an environmental and/or health perspective. The term "preservatives" or "preservation" is used broadly in this specification to refer to any treatment of a chemical which reduces the rate of deterioration of an engineered wood product, compared to the rate of deterioration of an analogous wood product lacking the preservative.

Preferably, the preservative may include at least one antioxidant. It has been discovered that naturally durable wood contains insecticidal, fungicidal, and antioxidant compounds [1]. Neither compound used alone explains the degree of durability shown by them acting together. This fundamental relationship was shown to be also applicable to wood preservatives. For example, it has been shown that the addition of the antioxidant BHT (butylated hydroxytoluene) enhances the activity of organic wood preservatives in laboratory tests. BHT is a common, low-cost antioxidant which is often used as a food additive, and thus is benign to humans.

More preferably, a combination of different organic fungicides with various antioxidants and/or metal chelators is used. Such a combination has been reported to give enhanced activity as compared to the organic biocide alone, with the best results usually obtained with all three compounds [2].

Water repellant material for waterproofing includes, but not limited to, paraffinic wax and slack wax, and silicones.

Examples of the wood stabilizer are silanes, ammoniacal wood stabilizers, ammoniacal copper wood preservatives, copper ammonium carbonate, copper ammonium acetate, ammoniacal copper arsenate and ammoniacal metal/dimethyl glyoxime. The wood stabilizer is present in an amount effective to reduce the swelling value of the engineered wood product to less than that of an analogous engineered wood product not treated with the wood stabilizer.

Figure 2A:
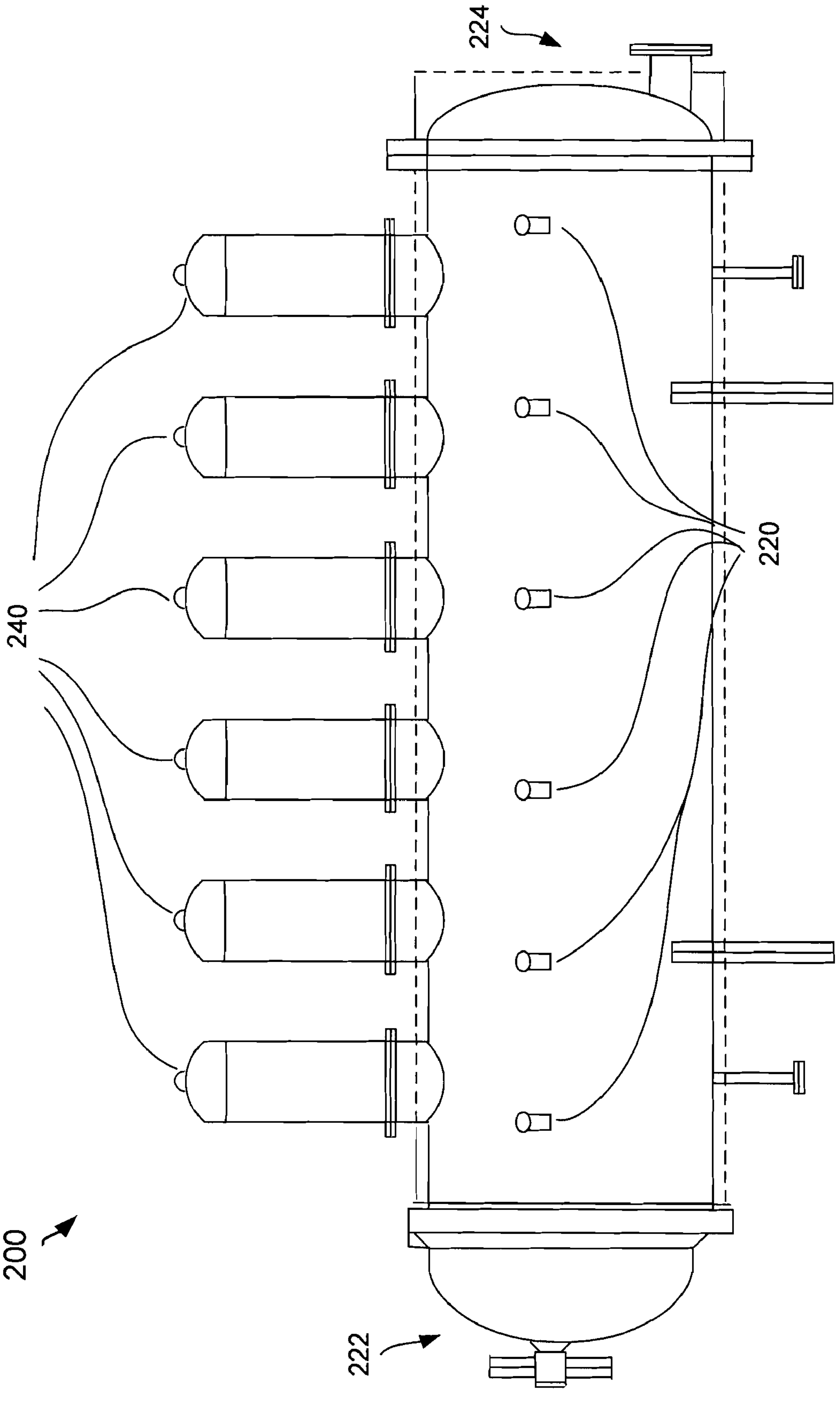
FIG. 2A illustrates a steam press apparatus with chemical injection ports utilized in an embodiment of the invention.
Figure 2B:
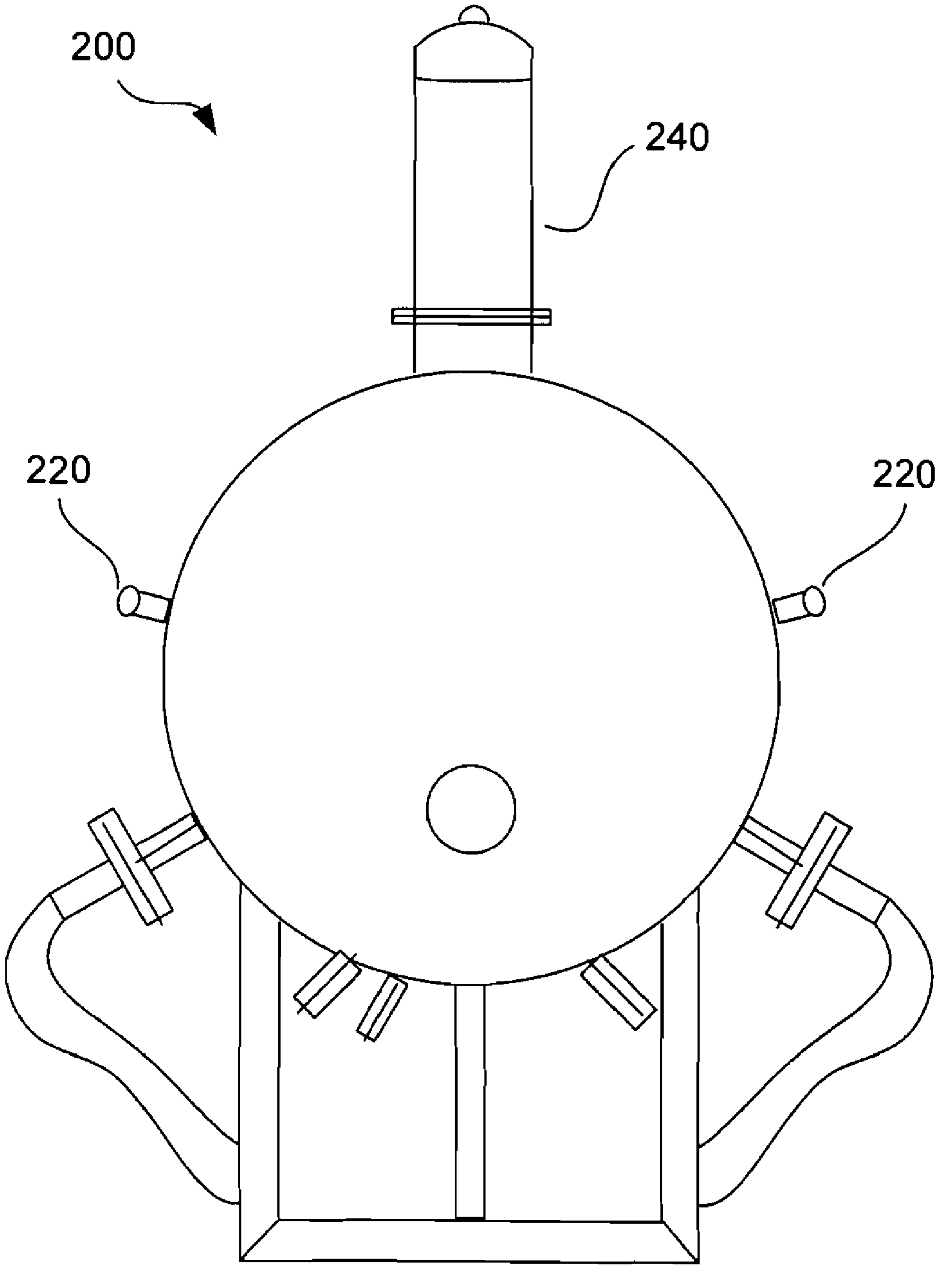
FIG. 2B is a front view of the steam press apparatus of FIG. 2A.

In another embodiment of the invention (Embodiment B) shown at 20, a wood enhancement agent is applied to wood strands of a scrim log material mat through a plurality of chemical injection ports 220 located on a steam press chamber 200 prior to a steam injection pressing process 360. Steam press chamber 200 as depicted in FIG. 2A comprises multiple chemical injection ports 220 through which a chemical fluid comprising a wood enhancement agent is applied to scrim log material mats 442 inside the chamber 200 before performing steam pressing of the mats 442. The aforementioned method is particularly useful in making a preservative or wood enhancement agent treated engineered lumber 340 that is thicker than 2 inches, e.g., in the range of from about 2 inches to about 8 inches.

In yet another embodiment of the invention (Embodiment C) shown at 30, a wood enhancement agent 510 is applied to a warm billet 340 that has a temperature greater than room temperature. Such a billet can be made from scrim as well as from strands, veneers, fibers, and combinations thereof. In one aspect, the wood enhancement agent 510 is applied to a billet having a temperature of greater than about 130° F. Preferably, the steam-pressed billet to which the wood enhancement agent 510 is applied has a temperature in a range of from about 130° F. to about 350° F., from about 150° F. to about 350° F., or from about 180° F. to about 300° F. The engineered lumber billet 340 to which the wood enhancement agent 510 is applied has a thickness of equal to or less than 2 inches. The techniques to apply a wood enhancement agent to a warm billet with a thickness of 2 inches or less include dipping, spraying, flood coating, diffusion, vacuum impregnation, pressure, or any combination thereof.

Figure 3:
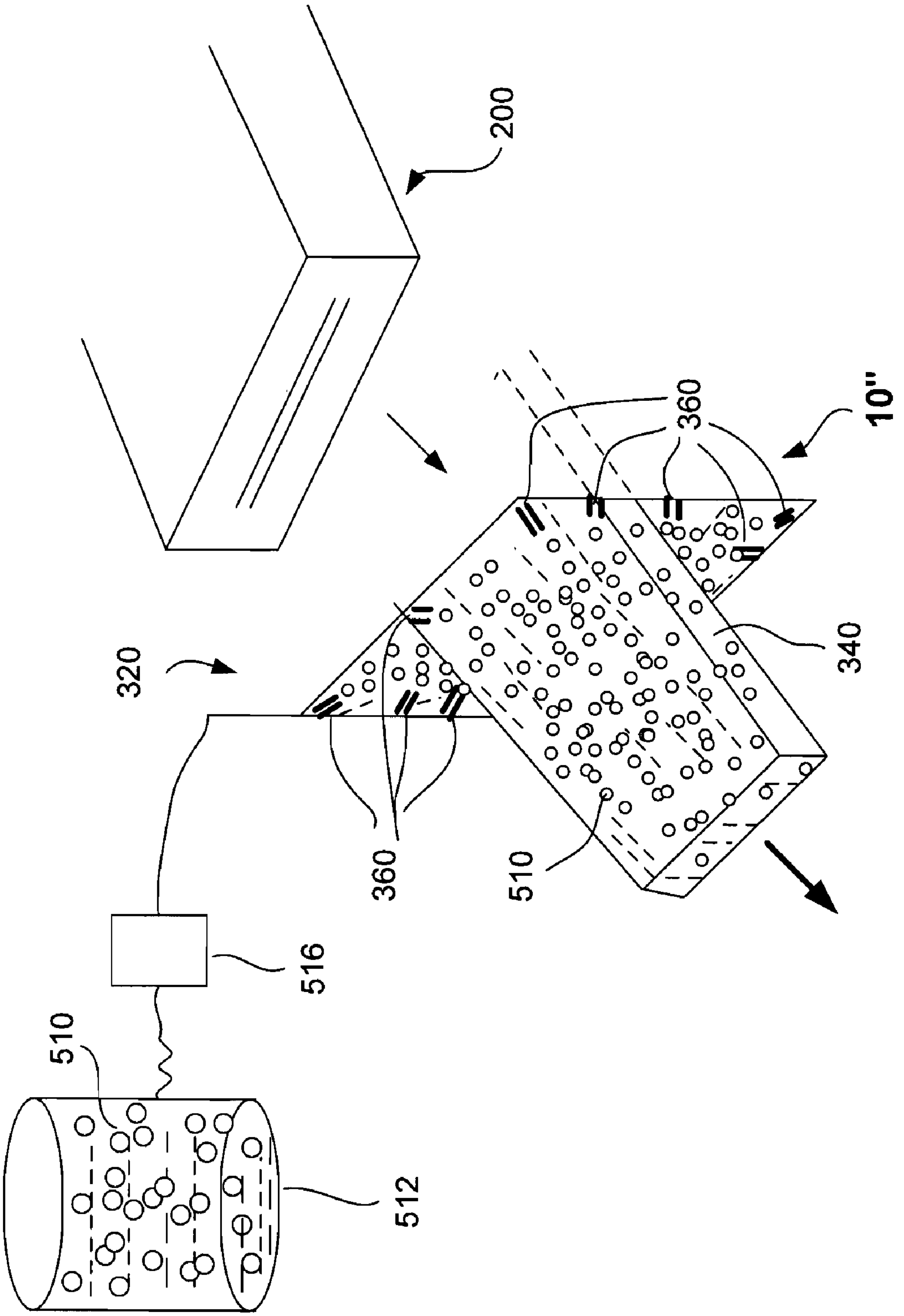
FIG. 3 is a schematic drawing showing addition of a chemical in an enclosed area after a steam press.

Referring now to FIG. 3, in one aspect of Embodiment C a warm billet exiting from a steam press 200 enters an enclosed chemical application area 320 equipped with numerous spray nozzles 360 that spray a chemical fluid comprising a wood enhancement agent 510 to substantially cover the surfaces of the warm billet 340. The chemical fluid containing the wood enhancement agent is supplied from a storage tank 512 and pumped into the spray nozzles 360 by a pump 516.

Figure 6:
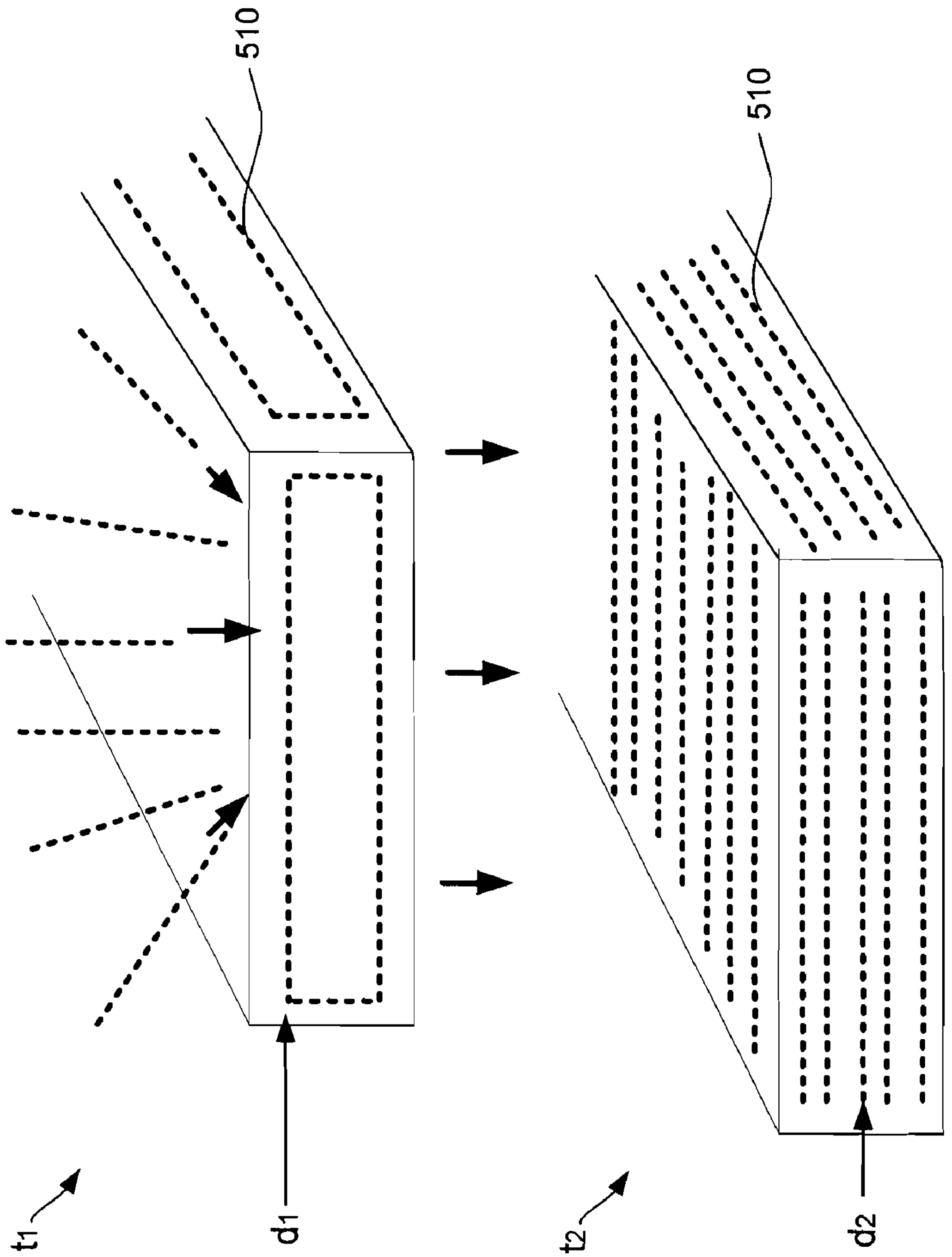
FIG. 6 shows the absorption or penetration depth of a wood enhancement agent in an engineered wood product at two time points.

The specific properties of the wood enhancement agent treated engineered wood product made by the aforementioned methods of the invention have features of well-absorbed, deeply-penetrated and evenly distributed wood enhancement agent throughout the wood product. In this regard, FIG. 6 illustrates the depth of penetration or absorption of the wood enhancement agent into a billet at two time points. The measured absorption depth of a preservative penetration into the billet at an initial time $t_1$ upon spray of the preservative is denoted as $d_1$, and that at a later time $t_2$ after cooling is denoted as $d_2$. The value of $d_2$ is in a range of between "a" and "b", i.e., $a \leqq d_2 \leqq b$, in which "a" is a minimum value and "b" is a maximum value. An estimated absorption or penetration depth $d_2$ of the wood enhancement agent in the billet is equal to or larger than about 1.5 inches. Preferably, the absorption or penetration depth $d_2$ of the wood enhancement agent in the billet is larger than 1.8 inches. More preferably, the absorption or penetration depth $d_2$ of the wood enhancement agent in the billet is about 2 inches.

One exemplary use for such an engineered wood product is as structural composite lumber for use in the core of wood doors, because it combines the screw holding and bending properties of lumber with the engineered stability of a particleboard core. One benefit of this structural wood product is that small trees can be used and the demand is lessened for harvesting trees from valued and protected old growth forests.

Figure 4:
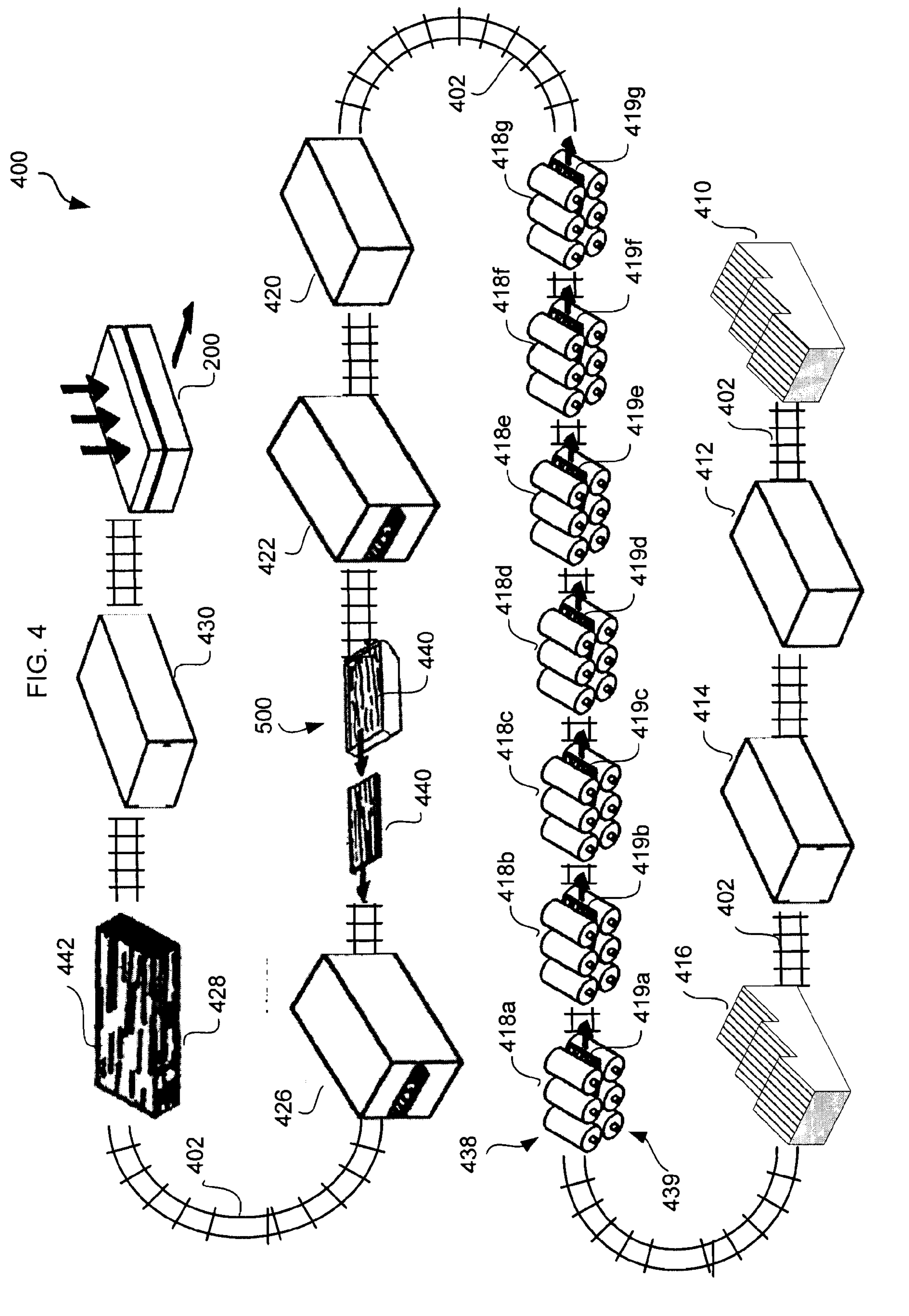
FIG. 4 is a diagram illustrating a production line system for making wood enhancement-agent treated engineered wood products.

The process of making a wood enhancement agent treated engineered wood product will now be described in additional detail. FIG. 4 illustrates an overall processing line system 400 that may be implemented in one embodiment of the present invention. Particular details about the specific stations and processing areas within the processing line system 400 are provided in the above-referenced and incorporated patent applications.

As shown in FIG. 4, the processing line system 400 comprises a conditioned log storage area 410, a first and second log crushing stations 412 and 414, a crushed log storage station 416, multiple scrim roll stations 418*a*-418*g*, a scrim roll mat storage area 420, a first dryer 422, a chemical and/or bonding agent/resin application area 500, a second dryer 426, a scrim mat lay-up area 428, a scrim-mat former/pre-press area 430, and a steam press chamber 200.

Conditioning Process

Conditioned log storage area 410 is for the storage and conditioning of logs. Logs are conditioned by either an indirect steaming process or a hot water soak. After being subjected to the aforementioned conditioning operation, logs are stacked and stored in conditioned log storage area 410 until they are ready to be introduced to the first log crushing station 412. Logs and processed log materials are transported throughout processing line system 400 from station to station via conveyor transport system 402. The speed and direction of conveyor transport system 402 is controlled and directed via a computer control system.

Crushing Process

Upon removal from the storage area 410, conditioned logs are placed on the conveyor transport system 402 for transport to first log crushing station 412. As many as six logs at a time may be fed into first log crushing station 412. Preferably, the respective logs that are fed into first crushing station 412 are alternately oriented, i.e., logs are processed by alternately feeding the large ends and small ends of the logs into first crushing station 412. The alternate feeding of the large and small end diameters of the logs into first crushing station 412 is essential in controlling the basis weight of a crushed log mat.

Prior to entering first crushing station 412, logs are scanned by a log-scanning device to acquire measurement data on the diameter of the large and the small end of each log. A log incisor similar in configuration to a "spike" roll may be utilized to produce small longitudinal cuts around the circumference of a log before the log is crushed. The longitudinal cuts help initiate and control the width of splits within a log, and improve the quality of subsequently produced scrim log material. Optionally, two ends of logs may be cut at a predetermined angle to enhance the subsequent log scrimming process. The angle of the cut at the log ends may be in a range of from about 15 to 60 degrees.

First crushing station 412 has multiple sets of crush rolls to efficiently split logs into smaller segments. Such crush roll sets are disclosed in the above-referenced incorporated patent applications. Preferably, a well-crushed log remains basically intact in the shape of an elongated oval with well-defined cracking throughout the cross-section. This configuration of a crushed log is referred to as a "mat." Further, an intact crushed log should have the particular consistency of a limp bundle of wood strands. These desired features can be accomplished if a log is properly conditioned and progressively crushed in a systematic manner. If a log is separated into two or more distinct pieces, the effective crushing of that log is greatly reduced.

The second log crushing station 414 helps efficient splitting of the crushed logs from the first crushing station 412 into smaller segments. To ensure that the crushed logs are not structurally damaged by this crushing operations, the crushing pressure applied to the logs is adjusted as the logs pass through the second log crushing station 414.

Scrimming Process

The crushed log mats obtained from the second log crushing station 414 further undergo a series of refined crushing operations until the crushed log mats are fed through the smallest crush roll set gap that is possible without causing damages to the length of the strands within a log mat. This particular refined crushing operation is accomplished by utilizing multiple log scrimming stations 418*a*-418*g*, in which each scrimming station 418*a*-418*g* has scrim roll sets for refined crushing of the crushed log material mat. As the crushed log material mat is passing through each scrimming station 418*a*-418*g*, the distance or space gap between each consecutive scrim roll set becomes progressively smaller, thus resulting in a finely crushed log material mat or scrim log material mat 419*a*-419*g*.

Each scrimming station 418*a*-418*g* has multiple sets of scrimming rolls for further crushing and refined cutting of the crushed log mats. The objective of the scrimming stations 418*a*-418*g* is to produce a group of separately defined, but not discrete, strands in which most of the strands are the length of the log and evenly separated from each other so as to produce a mat 419*a*-419*g* with a consistent basis weight. The number of scrimming stations 418*a*-418*g* needed for this operation is as many as it is needed so long as it is sufficient to provide a desired texture and consistency of a specific scrim log material. Scrimming roll sets are configured to comprise a top scrim roll 438 and a bottom scrim roll 439. Further, the scrim rolls can comprise varied sizes and spacing between the top and bottom rolls. Exemplary scrimming roll sets are described in the above-referenced and incorporated patent applications.

As the crushed log material is passing through each scrim station 418*a*-418*g*, the distance or space gap between each consecutive scrim roll set becomes progressively smaller, thus resulting in a finely crushed log material mat or scrim log material mat. This specific design helps reduce the diameter of the scrim in a series of consecutive stages without reducing the strength of the scrim fiber strands.

Drying Process

Once the scrim log material 419*g* has exited the scrimming station 418*g*, the scrim log material mat 419*g* is transported to the first drying station 422. Wet scrim log material 419*g* is dried at the first drying station 422 at a temperature in the range of from about 120° C. to about 190° C., with a margin of temperature correction to be ±5° C. The moisture content range for the dried scrim log material should be in the range of about 10% to about 20%.

The resultant moisture content of the scrim log material mat 440 at the first drying process of the first drying station 422 is used to control the uptake of a chemical and/or bonding agent/resin mixture that will subsequently be applied to the scrim log material mat. The scrim log material mat will absorb the chemical and/or bonding agent/resin mix based upon the moisture content of the scrim log material mat that has been reached in the first drying cycle. A drying temperature curve is established for a chemical and/or bonding agent/resin, in which the curve is a function of the time and moisture content conditions of a material that is necessary to ensure that once the chemical and/or bonding agent/resin is applied to the material, the chemical and/or bonding agent/resin will dry properly. Once a drying temperature curve is determined for a particular chemical formulation and/or bonding agent/resin, the moisture content of the scrim log material mat can be controlled through the drying process to effectively target the amount of bonding agent/resin that will be applied to the scrim log material.

Chemical and/or Bonding Agent Application Process

Figure 5A:
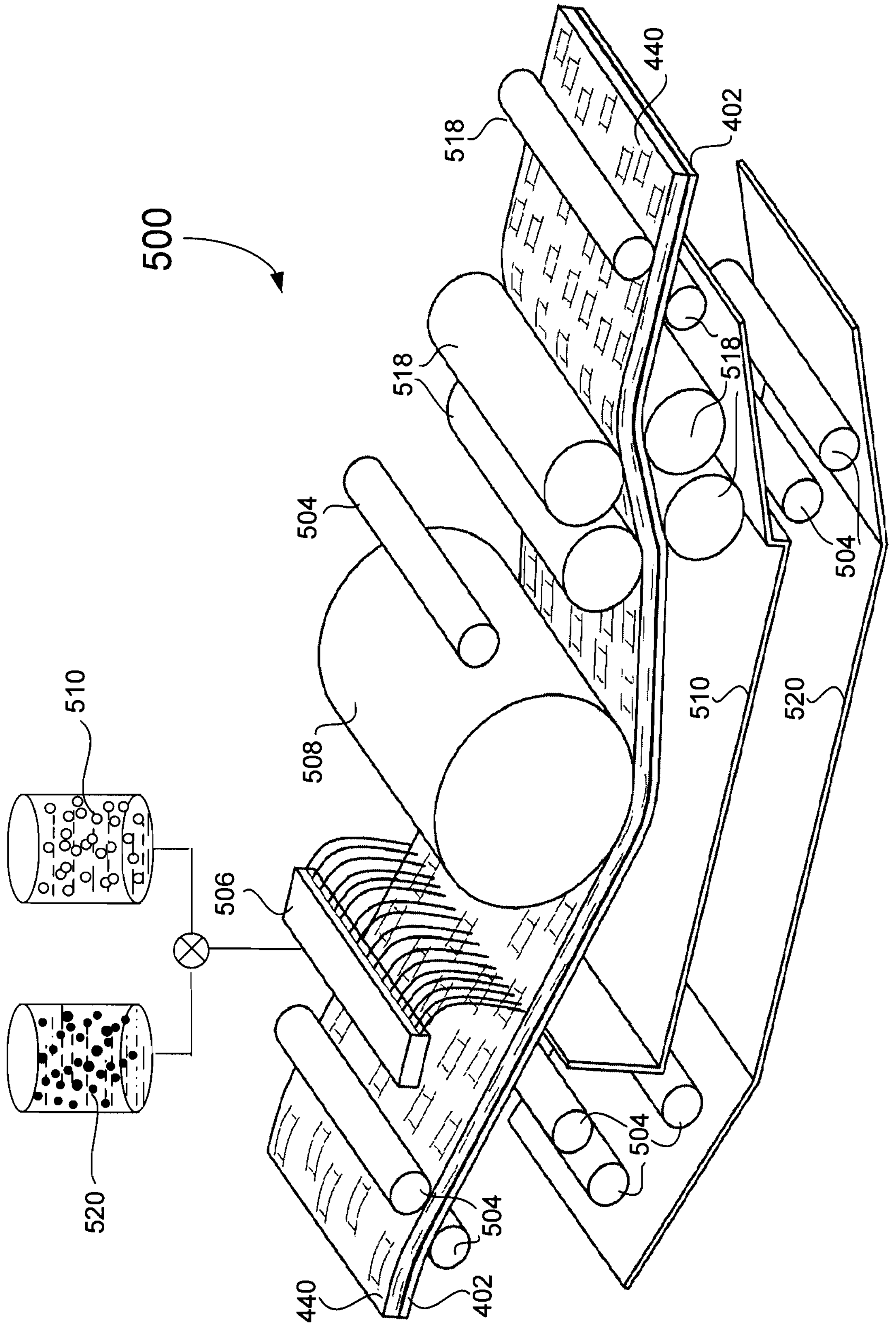
FIG. 5A is a perspective, partial cut-away view of a system for applying a chemical liquid comprising a wood enhancement agent and a bonding agent to a scrim log material mat, according to an aspect of the invention.

Still referring to FIG. 4, upon exiting the first drying station 422, the scrim log material 440 is transported to a chemical and/or bonding agent/resin application area 500 to apply a wood enhancement agent and/or a bonding agent/resin to the scrim log material mat 440. This requires the wood enhancement agent and/or bonding agent/resin to coat the exposed surfaces of the scrim log material mat 440, including fine cracks that can develop in the material during processing. Flooding the strands of the scrim log material mat 440 with the chemical or wood enhancing agent and/or bonding agent/resin from a weir or similar device 506 will provide sufficient coverage of the surfaces of the scrim log material mat 440 (FIG. 5A). The flooding rate of the chemical and/or bonding agent/resin onto the strands of the scrim log material mat must be high enough to substantially coat the bottom surfaces and interior areas that might be shadowed by surface strands. All exposed surfaces of the strands of the scrim log material mat 440 should be applied with an adequate amount of the chemical or enhancing agent and/or bonding agent/resin.

Preferably the chemical or enhancing agent and/or bonding agent/resin will be applied without disturbing or disorienting the strands of the scrim log material mat 440, in which all of the surfaces of the mat are covered by the chemical and/or bonding agent/resin liquid. The chemical and/or bonding agent/resin liquid can be applied in a cascading "waterfall" pattern, being applied over the top and sides of the scrim log material mat 440 and the bottom of the mat 440 being coated with the excess chemical and/or bonding agent/resin liquid that splashes up from a tray 510 bottom situated below the scrim log material mat 440. Air knives can be utilized to remove the excess chemical and/or bonding agent/resin liquid from the scrim log material mat 440, the excess chemical and/or bonding agent/resin liquid being recycled for further use within the chemical and/or bonding agent/resin applicator 506 (FIGS. 5A-5B).

Figure 5B:
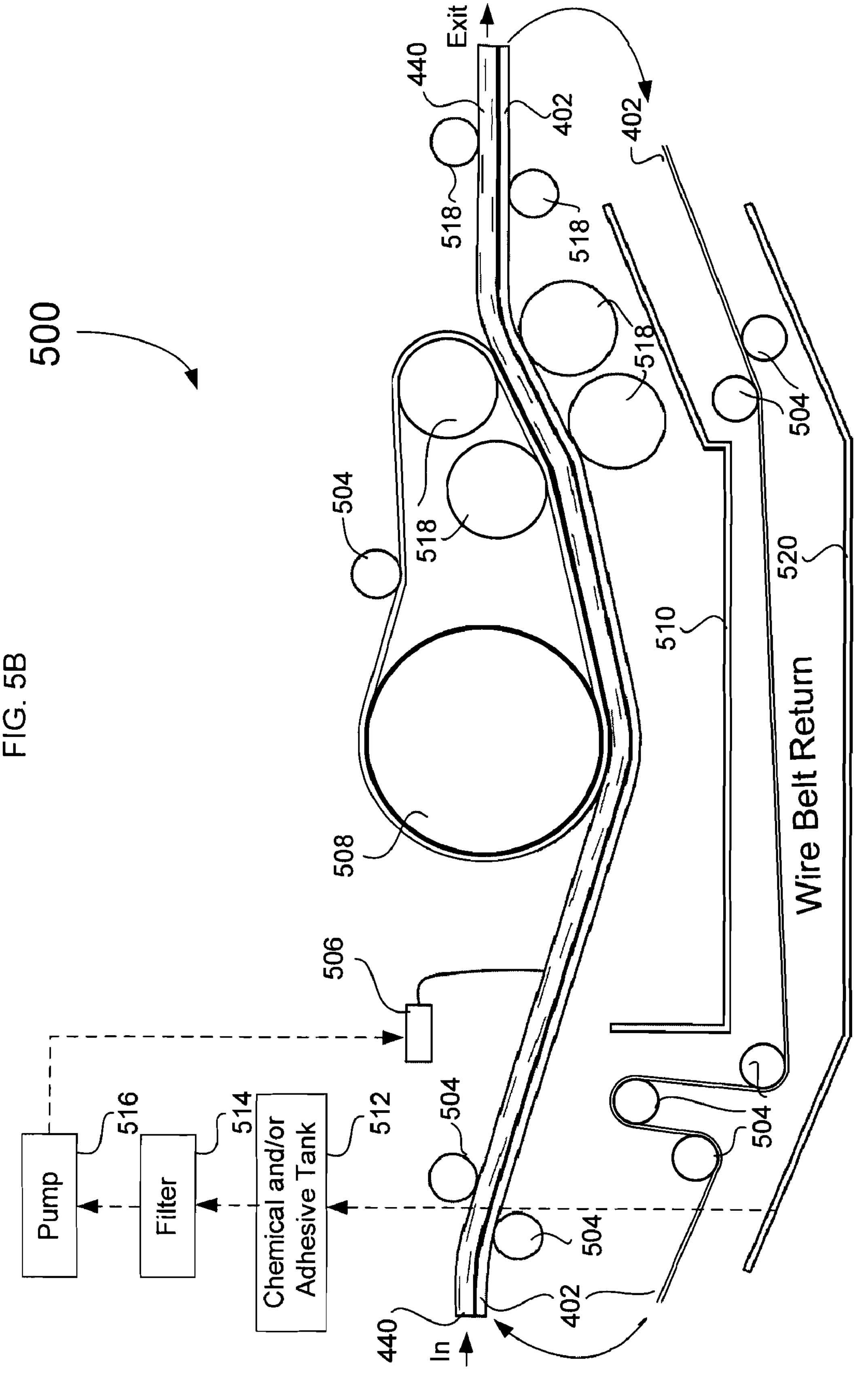
FIG. 5B is a side schematic view of the system of FIG. 5A.

Referring to FIGS. 5A and 5B, the scrim log material mat 440 will enter the chemical and/or bonding agent/resin applicator system 500 via a conveyor feed belt 402. The feed belt 402 is in mechanical contact with a series of roller sets 504, in which the directional movement and speed of the roller sets 504 directly correlates to the speed and direction of the feed belt 402. Chemical and/or bonding agent/resin is applied to the scrim log material mat 440 via a weir overflow applicator 506. Preferably, the weir overflow applicator 506 has dimensions that are sufficient to allow the applicator device 506 to be situated across the entire width of the conveyor feed belt 402. An applicator roll 508 is used to apply pressure to a scrim log material mat 440 and thus assist in ensuring that the chemical and/or bonding agent/resin evenly permeates the scrim log material mat 440.

A corrugated pan 510 situated below the conveyor feed belt 402 and the applicator roll 508 is used to capture the overflow from the weir overflow applicator 506. Corrugated pan 510 in combination with applicator roll 508 ensure that the chemical and/or bonding agent/resin is applied to the underside of the scrim log material mat 440. The application of chemical and/or bonding agent/resin to the underside of a scrim log material mat 440 is accomplished with a pressing function performed by applicator roll 508. As scrim log material mat 440 is transported beneath the applicator roll 508, applicator roll 508 presses downward on the scrim log material mat 440, thus submerging scrim log material mat 440 into the excess chemical and/or bonding agent/resin liquid contained within the corrugated pan 510. The chemical and/or bonding agent/resin applicator area 500 may further include a tank 512 for storage of the chemical and/or bonding agent/resin liquid, a filter 514 and a pump 516. Chemical and/or bonding agent/resin liquid stored in tank 512 is filtered at filter 514 and pumped into weir overflow applicator 506 via the pump 516 (FIG. 5B).

As a scrim log material mat 440 is fed into the weir overflow applicator 506 region, a continuous flow of chemical and/or bonding agent/resin is applied to the scrim log material mat 440. The mat 440 is then fed under the applicator roll 508, which applies pressure to scrim log material mat 440 to ensure that the chemical and/or bonding agent/resin liquid evenly permeates the scrim log material mat 440. Next, the scrim log material mat 440 is fed into a series of squeeze rolls 518 to wring the excess chemical and/or bonding agent/resin liquid from the scrim log material mat 440. The excess chemical and/or bonding agent/resin that has been wrung from the scrim log material mat 440 is collected within a drip pan 520 situated beneath squeeze rolls 518 to be later on returned to tank 512 for continued use within the applicator system 500. Upon exiting squeeze rolls 518, scrim log material mat 440 is transported out of the applicator system 500.

Second Drying Process

The scrim log material mat 440 is transported to the second drying station 426 after it has been applied with the chemical and/or bonding agent/resin. The second drying station 426 operates at a lower temperature than the first drying station 422. The lower temperature can prevent chemicals from decomposition and/or avoid pre-curing the bonding agent/resin that has been applied to the scrim log material 440. The second drying station operates at a temperature range of about 100° C. to about 150° C. The purpose of the secondary dryer is to B-stage the bonding agent/resin and bring the moisture content of the wood strands to a range of about 3%-10%. A B-stage for a thermosetting bonding agent/resin is an intermediate state of curing, in which the bonding agent/resin possesses the property of becoming permanently hard and rigid when heated or cured.

Mat Lay-Up Processing

Scrim log material mats 440, after the second drying process, are transported to mat lay-up station 428, where the moisture content, width, and weight are determined to ascertain the density of each scrim log material mat 440, and to ensure no voids are present in the mat 440. The determination of these parameters is assisted with a computerized control system. Any voids found in the mats 440 are closed during the determination of the initial width and weight adjustments of the mats 440.

Density variations within mats are reduced by tapering of the ends of the mats and overlapping mats by alternating light mat ends with heavy mat ends. Any gaps or voids discovered during the mat lay-up operation should be filled. The mat ends can be laid-up end-to-end using butt joints, scarf joints, or lap joints. If the scrim mat ends are well broomed so that they will interlock with adjoining mats, a lap joint may be adequate. If the mat ends are heavy, lap joints will cause undesirable density variations and in this instance butt joints or scarf joints should be used. Scarf joints are preferable since scarf joints will bond the lay-up mats 442 together and maintain the desired density.

Mat Pre-Press Processing

Next, the lay-up mats 442 are transported to a mat-former or a mat pre-press station 430 for further refined formation of scrim log material mats. Mat pre-press station 430 has a set of platens or a roller press system for the refined formation of the scrim log material. The platens and rollers of the roller press system conduct heat after being heated to a predetermined temperature. The heated pre-press assists in the further refined formation of the scrim log material mat and prepares the fibers of the mat by heating the mat prior to introducing the mat into the steam press chamber 200. This reduces the amount of time that the log scrim material mat 442 is required to spend in subsequent steam press chamber 200 operations. Prior to entering the steam press chamber 200, the scrim log material mats are introduced into an incremental cut-off system to cut the size so that mats can fit into the steam press chamber 200.

Steam Press Processing

Thereafter mats 442 are consecutively fed into a steam press chamber 200. The steam press chamber 200 that may be utilized within the present invention has two ends and each end has a quick opening doors 222 and 224 (FIG. 2A). The quick opening doors at both ends of the steam press chamber 200 make it easier to clean and maintain and also facilitate the loading and unloading in a single operation similar to those of conventional hot presses. Hydraulic cylinders 240 are located on the outside of the steam press chamber 200. Seals that can withstand pressures up to 1500 kPa pressure are also implemented. With the hydraulic cylinders 240 located outside the steam press chamber 200, rams can be fixed to the press platen with a "quick" release mechanism that allows for the easy removal of a press for cleaning and maintenance requirements. Steam is supplied to the steam press chamber 200 via a boiler or surge tank that is in mechanical connection with the steam press chamber 200. Additionally, the steam press chamber 200 may include multiple chemical injection ports 220 through which a chemical liquid containing a wood enhancement agent may be applied onto a scrim log material mat 442 placed inside the steam press chamber 200.

Cutting and Finishing Processing

Upon exiting the steam press chamber cycle, the scrim log material mats 340 are commonly referred to as "billets" or "slabs." The handling of these billets or slabs 340 is very important. The slabs 340 are usually extremely large in size (e.g., they can be upwards of 60 ft long in length) in addition to being very hot and heavy (weighing upwards of 6000 lbs). The billets or slabs 340 are transported to stations for the cooling and to cut-off facility stations to cut the slabs into beams of predetermined dimensions.

The following examples are provided to aid and enable a person skilled in the art in making and using the invention. Although the following examples are based primarily on a cedar-oil based wood enhancement material, namely formulations of the CEDARTREAT™ material as described above, it should be understood that the invention is not limited to cedar-oil based materials as wood enhancement agents.

EXAMPLE 1

A loose scrim mat is treated with the wood enhancement agent CEDARTREAT™ in combination with an adhesive or bonding agent in an adhesive application tank as shown and described in the referenced and incorporated patent applications. CEDARTREAT is a solvent-based green or dry wood penetrant admixture of cedar oil, silane, and a solvent manufactured by CedarCide Industries, Inc., 4405 N Frazier St., Conroe, Tex. 77303-1442. Color enhancement or dye may be added to the mixture to achieve a desired shade of color and provide a basis for measuring penetration. The scrim mat is later subjected to a pressing operation with a steam press, also as described in the referenced and incorporated patent applications, to form a billet of engineered wood product.

Internal bond tests are run on the engineered wood products produced by addition of adhesives alone or by addition of a mixture comprising adhesives and wood enhancement agents to the scrim strands during the billet making process. The internal bond testing will indicate how well the adhesives hold on to the wood fibers in the beam. The experimental results are expected to show that there is no substantial difference between the internal bonds using adhesives alone and those of adhesives in combination with the wood enhancement agent CEDARTREAT™.

It is also expected that the treatment of the engineered wood product will impart hydrophobicity to solid wood samples, creating water-repellent effects. The results are expected to show that adding CEDARTREAT into adhesives not only improves the bonding values but also improves the water repellent properties, and thus provides several of the desirable properties for a wood enhancement agent.

EXAMPLE 2

A mat of scrim-based material is treated with the wood enhancement agent CEDARTREAT by application of the agent within a steam press. The wood enhancement agent is applied by spraying the material onto the mat (a) immediately before the pressing operation, (b) immediately after the pressing operation but before removal of the billet from the steam press, or (c) both. It is believed that the surfaces of the billet will cool enough after the treatment application to create a slight vacuum within the billet to enhance the absorption of the wood enhancement agent.

After the treatment, the billet is removed from the steam press and subjected to further process steps to form wood enhancement treated engineered wood product, including cutting the billet to desired widths and/or lengths.

EXAMPLE 3

A warm billet of scrim-based engineered wood product is treated with the wood enhancement agent CEDARTREAT after it has been removed from a steam press. The warm billet is dipped, flow-treated, or sprayed with the wood enhancement agent. It is believed that the surfaces of the billet will cool enough during the treatment to create a slight vacuum within the billet to enhance the absorption of the CEDARTREAT material.

After the treatment, the billet is subjected to further process steps to form wood enhancement treated engineered wood product, including cutting the billet to desired widths and/or lengths.

EXAMPLE 4

Billets of ambient temperature scrim-based material were dipped or flow treated by application of a heated CEDARTREAT wood enhancement agent. The wood enhancement agent was applied at an elevated temperature relative to the interior temperature of the billet. The CEDARTREAT material was dyed red and heated to 130° F. A red dye was used to indicate the depth of penetration of the treatment material into the sample billets. All samples were 24 inches long and 1.75 inches thick but varied in width. One group was 5.5 inches wide, a second was 5.75 inches wide, and a third was 11.25 inches wide. The second and third groups were end-coated, to prevent end-grain absorption, prior to treatment. One sample from groups 1 and 2 was only treated on one end by a 30-second dip.

Sections of the billet were weighed, dipped in the treatment material for 0, 15, 30, 45, or 60 seconds, and reweighed. The samples then were either bisected to determine the depth of penetration at midpoint, or not cut and exposed to the weather aboveground with either the flat or edge side oriented upward.

The amount of solution absorbed in the samples remained relatively the same from dip times of from 15 to 60 seconds. The average was approximately 0.05 kg in the samples. This suggests that a scrim-based engineered wood product does not require prolonged dip times for solution absorption with the CEDARTREAT material. Therefore, it is believed that treating a warm billet of scrim-based engineered wood material with a short-term dip or spray will result in significantly greater solution uptake than by applying the treatment solution at a greater temperature than the ambient of the billet.

Penetration at the midpoint of the samples was variable, so the maximum penetration was used as the unit of measure. Penetration on day 2 following treatment was obtained from some samples and varied from ⅜ to ½ inch. All samples were measured (or re-measured) on day 3 and varied from ⅜ to ¾ inch. Re-measurements showed that penetration increased from day 2 to day 3 in at least some species. Re-measurements on day 4 showed no increased penetration. It is believed that penetration would have continued to occur if the beam sections were slightly more moist (as when coming from a steam press) at the time of treatment.

Dip-treating one end of end-coated or non-coated samples 7½ inches in treating solution showed that end-coating samples may not be necessary. Both samples had greater than 2-inches of penetration and both had significant portions of their cross sections penetrated when cut 2 inches from the end.

The following tables provide results from the process as indicated above:

TABLE 2

| Group No. I (1¾ × 5½ × 24 in.) No End Coat | | | | | | |
|---|---|---|---|---|---|---|
| Sample No. | Dip Time (sec.) | Initial Wt. (kg) | Final Wt. (kg) | Difference in Wt (kg) | Maximum Penetration Inches Day 2 | Maximum Penetration Inches Day 3 |
| 1 | 15 | 3.39 | 3.43 | 0.04 | N/A | N/A |
| 2 | 30 | 3.19 | 3.24 | 0.05 | | |
| 3 | 45 | 3.37 | 3.42 | 0.05 | | |
| 4 | 60 | 3.57 | 3.63 | 0.06 | | |
| 5 | 0 | 3.48 | 3.50 | 0.02 (end-dipped) | | |
| 6 | 0 | 3.35 | | | | |

TABLE 3

| Group No. II (1¾ × 5¾ × 24 in.) End Coated | | | | | | |
|---|---|---|---|---|---|---|
| Sample No. | Dip Time (sec.) | Initial Wt. (kg) | Final Wt. (kg) | Difference in Wt (kg) | Maximum Penetration Inches Day 2 | Maximum Penetration Inches Day 3 |
| 1 | 15 | 3.47 | 3.52 | 0.05 | | |
| 2 | 15 | 3.44 | 3.50 | 0.06 | ½ | ¾ |
| 3 | 15 | 3.60 | 3.64 | 0.04 | ⅜ | ⅜ |
| 4 | 30 | 3.16 | 3.20 | 0.04 | | ⅜ |
| 5 | 30 | 3.34 | 3.38 | 0.04 | | ¾ |
| 6 | 30 | 3.35 | 3.41 | 0.06 | | |
| 7 | 45 | 3.47 | 3.51 | 0.04 | | |
| 8 | 45 | 3.42 | 3.46 | 0.04 | | 3/16 |
| 9 | 45 | 3.26 | 3.33 | 0.07 | | 11/16 |
| 10 | 60 | 3.37 | 3.42 | 0.05 | | |
| 11 | 60 | 3.53 | 3.57 | 0.04 | | ⅜ |
| 12 | 60 | 3.50 | 3.56 | 0.06 | ½ | ½ |
| 13 | 0 | 3.55 | 3.57 | 0.02 (end-dipped) | | |
| 14 | 0 | 3.64 | | | | |

TABLE 4

| Group No. III (1¾ × 11¼ × 24 in.) End Coated | | | | | | |
|---|---|---|---|---|---|---|
| Sample No. | Dip Time (sec.) | Initial Wt. (kg) | Final Wt. (kg) | Difference in Wt (kg) | Maximum Penetration Inches Day 2 | Maximum Penetration Inches Day 3 |
| 1 | 15 | 6.92 | 7.01 | 0.09 | | ½ |
| 2 | 15 | 6.78 | 6.87 | 0.09 | | |
| 3 | 15 | 6.86 | 6.94 | 0.08 | | 9/16 |
| 4 | 30 | 7.23 | 7.31 | 0.08 | | ⅝ |
| 5 | 30 | 6.66 | 6.77 | 0.11 | | |
| 6 | 30 | 6.92 | 7.01 | 0.09 | | ⅞ |
| 7 | 45 | 6.94 | 7.02 | 0.08 | | |
| 8 | 45 | 7.07 | 7.15 | 0.08 | 7/16 | ¾ |
| 9 | 60 | 6.64 | 6.74 | 0.1 | | |
| 10 | 60 | 6.77 | 6.88 | 0.11 | | ⅝ |

EXAMPLE 5

A billet of scrim-based engineered wood product is allowed to reach an ambient temperature after forming the billet, and/or after cutting billets into desired lengths and/or widths. The billet is thereafter subjected to (a) a reheating operation to raise the interior temperature of the billet, or (b) subjected to a heated steam bath and/or other reheating operation and/or other moisturizing operation to raise both the interior temperature of the billet and also the moisture content.

The billet is thereafter treated with the wood enhancement agent CEDARTREAT by application of the agent by dipping, flow-treating, or spray. Optionally, the wood enhancement agent may be applied at an elevated temperature relative to the temperature of the billet. It is believed that the surfaces of the billet will cool enough after the treatment application to create a slight vacuum within the billet to enhance the absorption of the wood enhancement agent.

In summary, the present invention, among other things, provides methods of making a wood enhancement agent treated engineered wood product. The method includes the step of incorporating a wood enhancement agent into a wood product during the wood billet making process, or thereafter. The present invention will have useful applications in the timber and construction industries as the methods provided herein not only can reduce cost in preserving a wood product, but also overcome the limitations such as uneven distribution of biocides throughout the wood product, and requirement of the use of biocides less safe in or around habitable spaces.

All of the references cited herein are incorporated by reference in their entirety.

The Foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments and examples were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES

[1] College of Forest Resources, Mississippi State University. http://www.cfr.msstate.edu/fwrc/forestp/anti.htm (accessed Nov. 8, 2006)

[2] Schultz T P and Nicholas D D. Development of environmentally-benign wood preservatives based on the combination of organic biocides with antioxidants and metal chelators. Phytochemistry. 2002; November; 61 (5):555-60. Abstract.

What is claimed is:

1. A wood enhancement agent treated engineered wood product comprising:

a. a reconstituted wood product consolidated from a scrim log material mat comprising scrim fiber strands; and b. a wood enhancement agent substantially evenly distributed in the scrim fiber strands of the reconstituted wood product;

wherein the wood enhancement agent is distributed in the scrim fiber strands of the scrim log material mat before the scrim log material mat is subjected to a steam press process to form the wood enhancement agent treated engineered wood product.

2. The wood enhancement agent treated wood product of claim 1, wherein the wood enhancement agent is distributed in the scrim fiber strands of the scrim log material mat at the same time with a bonding agent.

3. The wood enhancement agent treated wood product of claim 1, wherein the wood enhancement agent is distributed in the scrim fiber strands of the scrim log material mat after a bonding agent treatment and a drying process.

4. The wood enhancement agent treated wood product of claim 3, wherein the application of the wood enhancement agent is performed inside a steam press chamber.

5. The wood enhancement agent treated wood product of claim 3, wherein the application of the wood enhancement agent is performed prior to entry of the scrim log material mat into a steam press chamber.

6. A wood enhancement agent treated engineered wood product comprising:

a. a reconstituted wood product consolidated from a scrim log material mat comprising scrim fiber strands; and b. a wood enhancement agent substantially evenly distributed in the scrim fiber strands of the reconstituted wood product;

wherein the wood enhancement agent is applied to a warm billet after the billet is formed by a steam press process, whereby the wood enhancement agent is substantially evenly distributed in the scrim fiber strands of the engineered wood product.

7. The wood enhancement agent treated wood product of claim 6, wherein the wood enhancement agent is applied by a technique selected from the group consisting of dipping, spraying, flood coating, diffusion, vacuum impregnation, pressure, and any combination thereof.

8. The wood enhancement agent treated wood product of claim 6, wherein the wood enhancement agent comprises at least one of a preservative, a water repellant, a fungicide, an insecticide, a stabilizing agent, wax, a ultra-violet light inhibitor, and any combinations thereof.

9. The wood enhancement agent treated wood product of claim 6, wherein the wood enhancement agent comprises at least one antioxidant.

10. The wood enhancement agent treated wood product of claim 6, wherein the wood enhancement agent is absorbed and penetrated into the wood product with a depth of absorption or penetration equal to or greater than 1.75 inches.

* * * * *